Aug. 7, 1956   H. W. HEMPEL   2,757,730
MACHINE FOR FEEDING AND SEVERING A MEASURED LENGTH OF TAPE
Filed Feb. 9, 1951   5 Sheets-Sheet 1
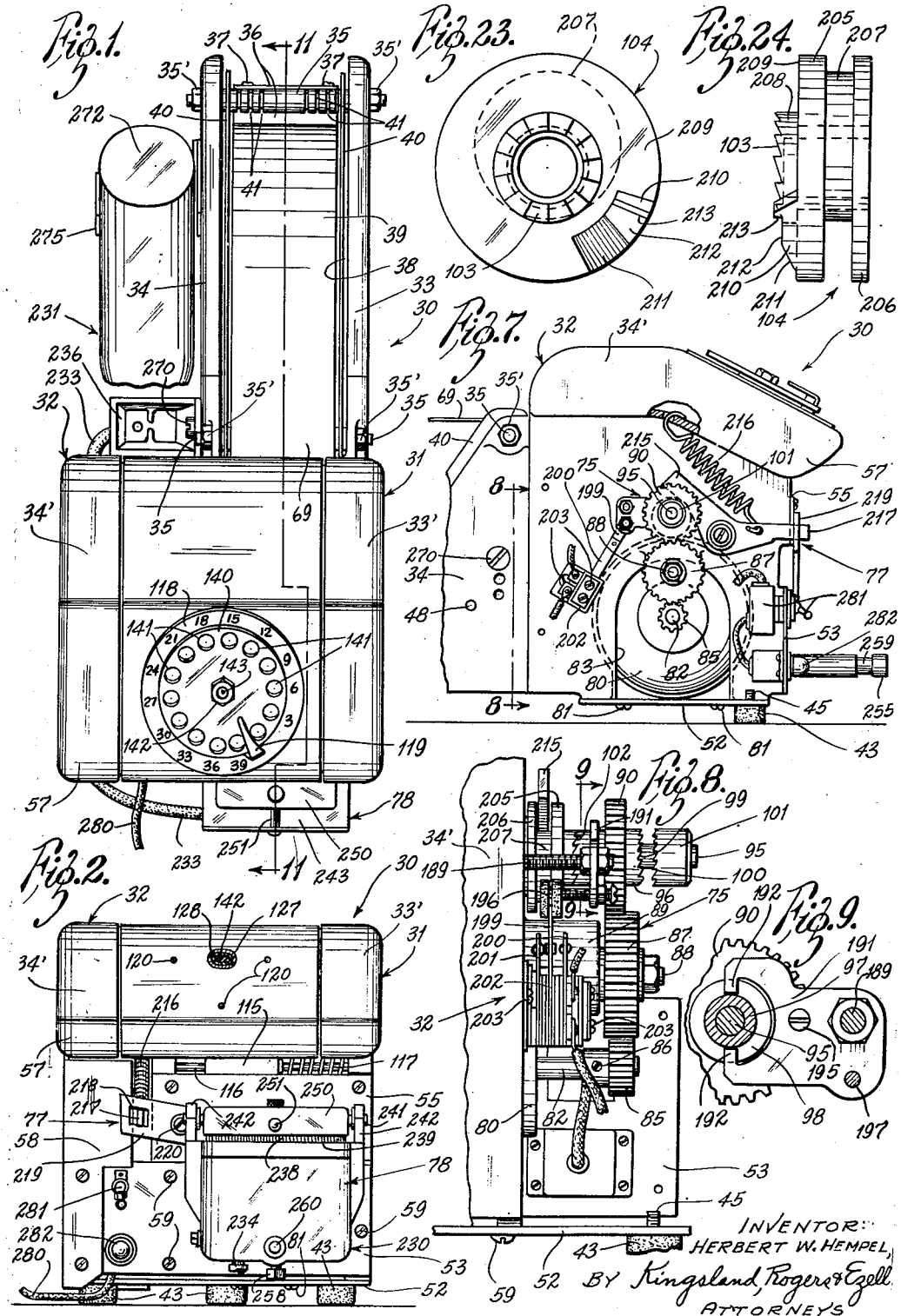
INVENTOR:
HERBERT W. HEMPEL,
BY Kingsland, Rogers & Ezell
ATTORNEYS Aug. 7, 1956     H. W. HEMPEL     2,757,730
MACHINE FOR FEEDING AND SEVERING A MEASURED LENGTH OF TAPE
Filed Feb. 9, 1951     5 Sheets-Sheet 2
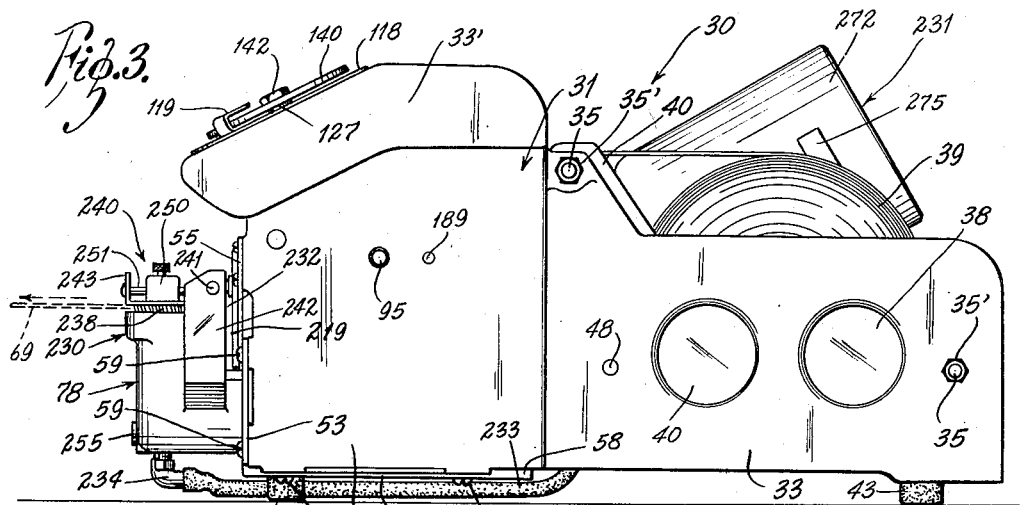
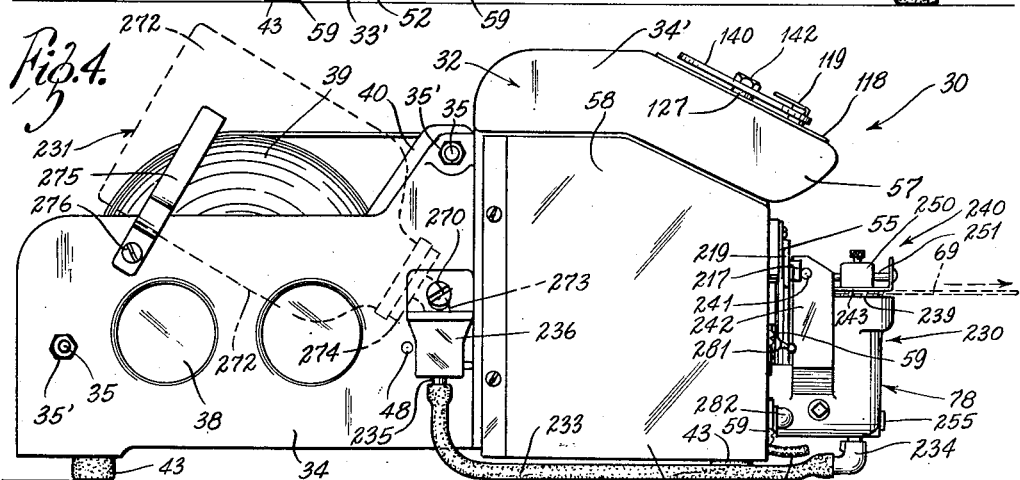
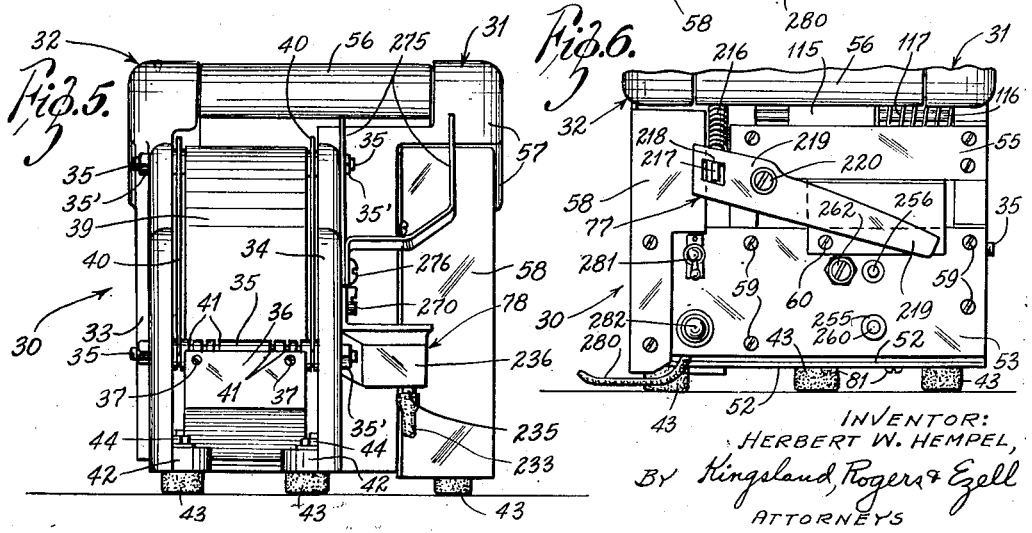
INVENTOR:
HERBERT W. HEMPEL,
By Kingsland, Rogers & Ezell
ATTORNEYS

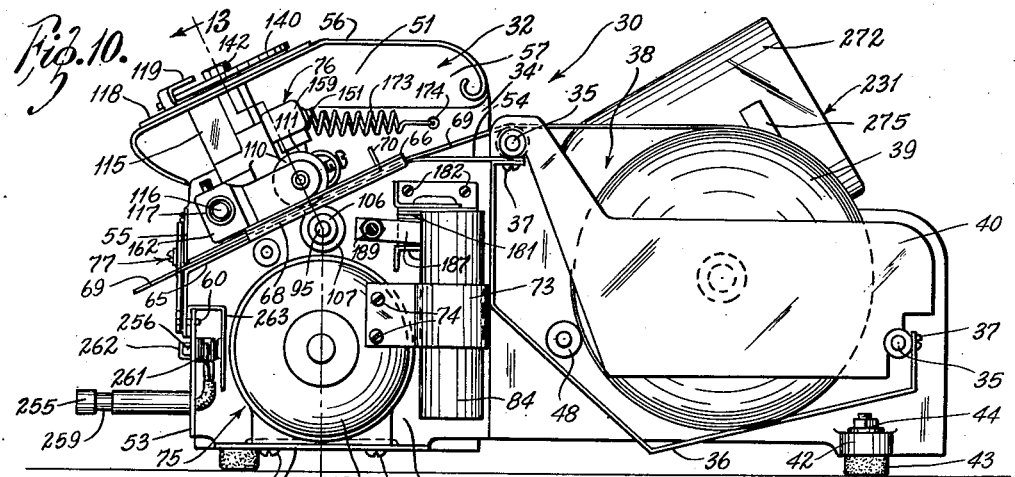

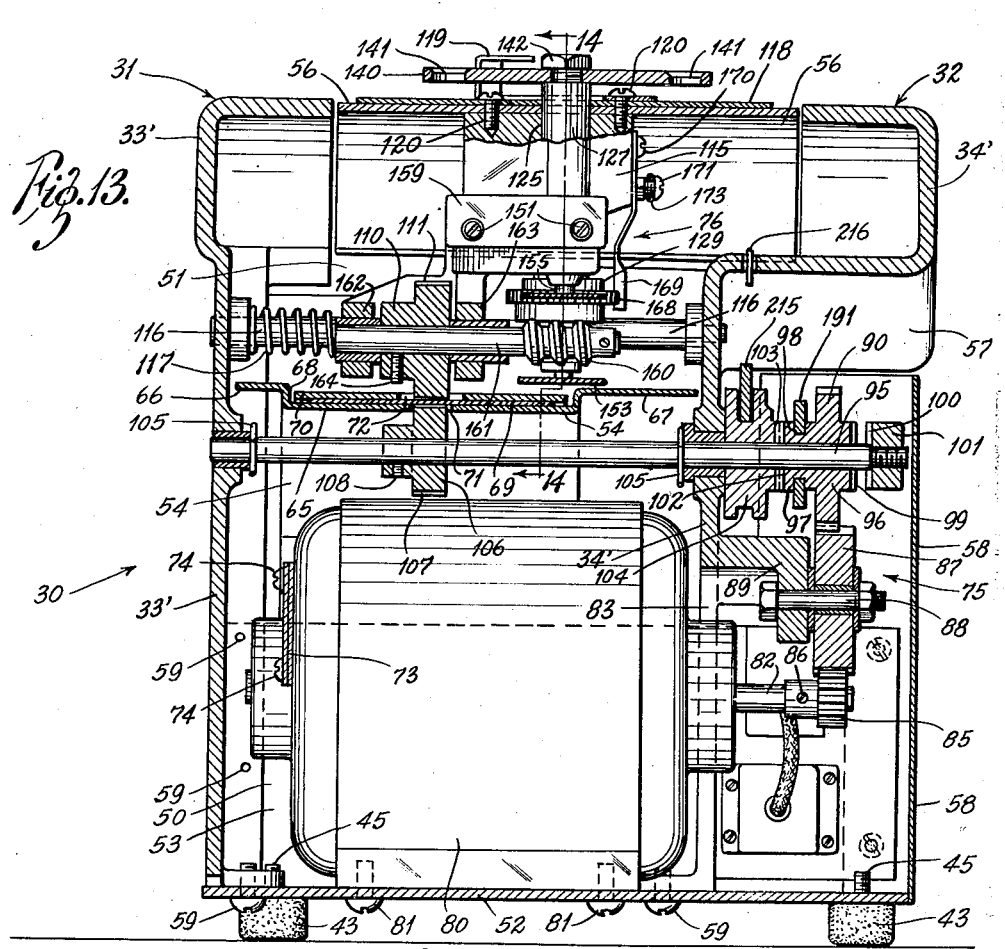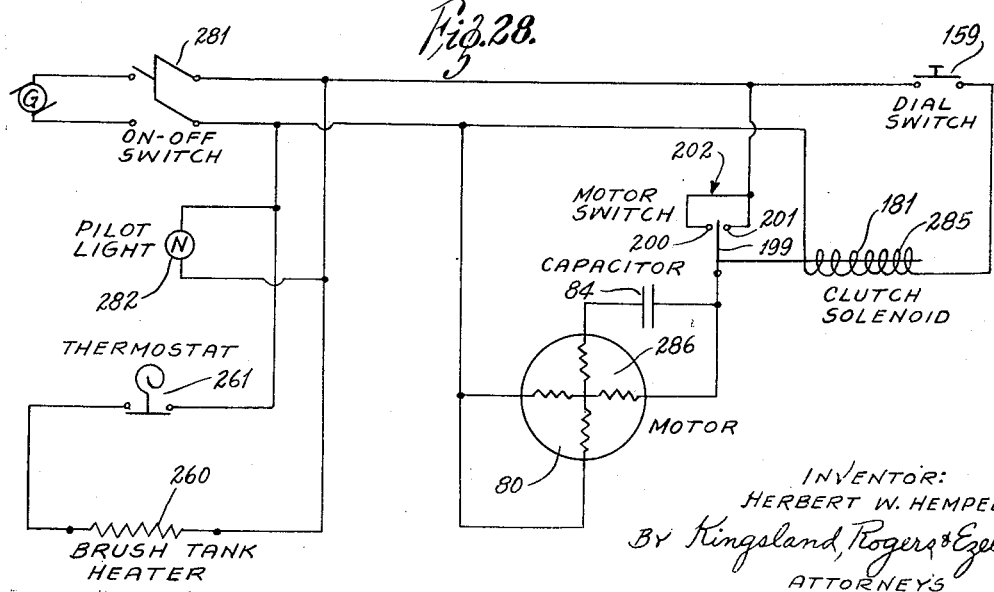

Aug. 7, 1956
H. W. HEMPEL
2,757,730
MACHINE FOR FEEDING AND SEVERING A MEASURED LENGTH OF TAPE
Filed Feb. 9, 1951
5 Sheets-Sheet 5
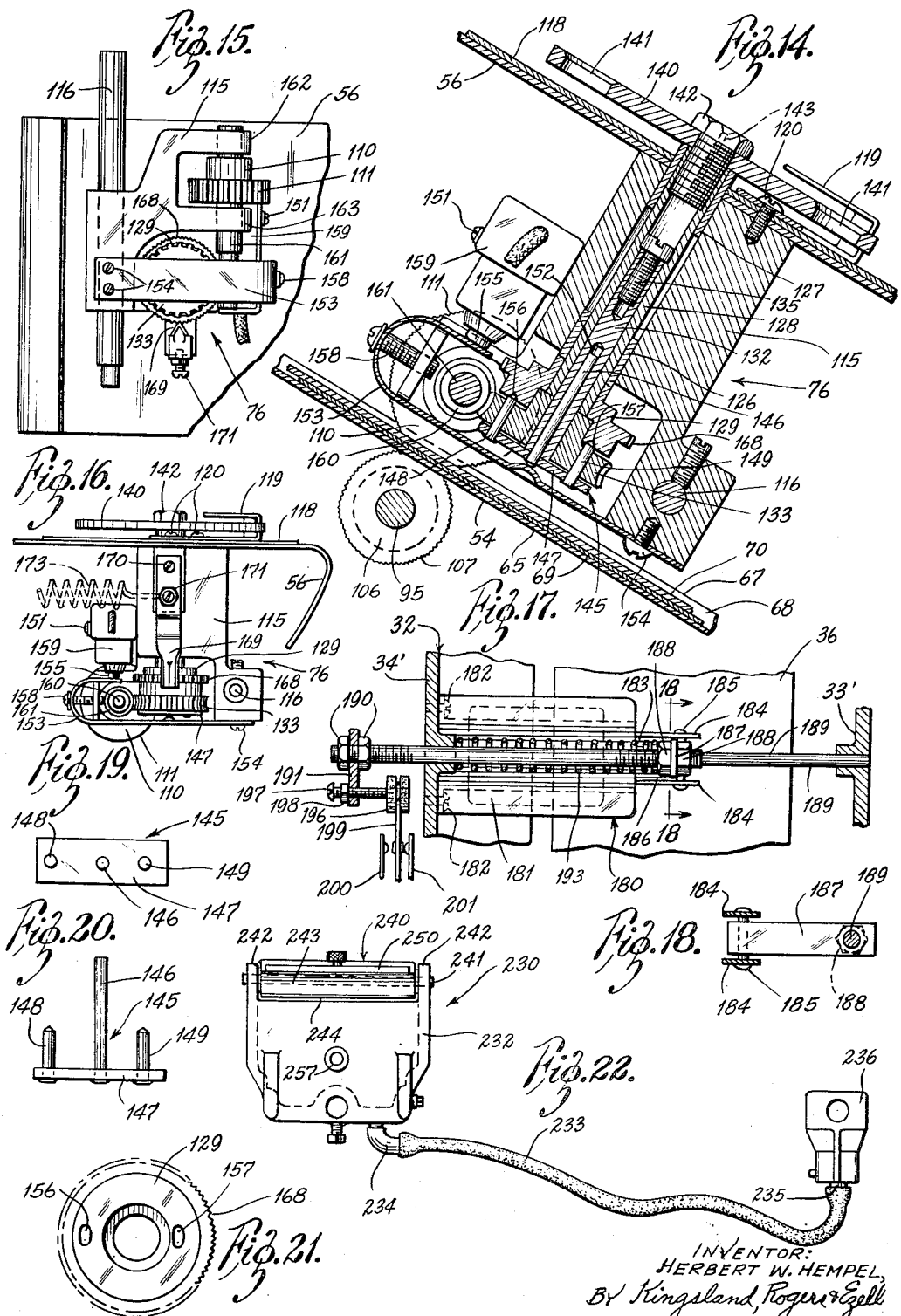
INVENTOR:
HERBERT W. HEMPEL
BY Kingsland, Rogers & Ezell
ATTORNEYS

United States Patent Office 2,757,730
Patented Aug. 7, 1956

2,757,730

MACHINE FOR FEEDING AND SEVERING A MEASURED LENGTH OF TAPE

Herbert W. Hempel, Belleville, Ill., assignor to Marsh Stencil Machine Company, Belleville, Ill., a corporation of Illinois Application February 9, 1951, Serial No. 210,155

17 Claims. (Cl. 164—42)

The present invention relates generally to machines for dispensing gummed tape used for packaging purposes, and more particularly to an electrically actuated and controlled machine which is adapted automatically to dispense a measured length of wetted tape upon a simple manual indication of the length of tape desired.

The invention disclosed herein is directed to the same general subject matter as applicant's copending applications, Serial No. 115,238, filed September 12, 1949, now Patent No. 2,727,570, and Serial No. 121,879, filed October 17, 1949, now Patent No. 2,655,372.

Briefly, the present invention comprises an electrically actuated and controlled gummed tape dispensing machine which accurately measures the indicated length of tape while feeding it at a uniform rate of speed over a moistening brush. The moistened tape issues from the front of the machine and is cut off to the measured length, whereupon, the machine comes to rest. Operation of the machine is instigated by a simple manual maneuver, the action thereafter being completely automatic. The several parts of the tape dispensing machine disclosed herein combine to effect the present novel mechanism, and include a power unit which acts through a sliding clutch selectively to drive a feed mechanism and a cut-off knife. The sliding clutch is solenoid-spring operated under the influence of a measuring and control unit. The tape moistening unit is heated under thermostatic control and is readily removable from the machine for cleaning.

An object of the present invention is to provide a novel simplified electric tape dispensing machine which is fully automatic in its operation of dispensing moistened tape after a desired length of tape is indicated by a simple manual maneuver.

Another object is to provide a novel electric tape dispensing machine which accurately measures the tape dispensed and which moves a dispensed segment of tape at a uniform rate of speed over a moistening brush to assure proper wetting of the glue on the tape.

Another object is to provide a novel electrically actuated and controlled tape dispensing machine in which a tape measuring and dispensing cycle may be initiated by turning a finger plate or dialing disc.

Another object is to provide a novel electrically actuated and controlled tape dispensing machine which automatically completes a tape measuring and dispensing cycle once it is initiated.

Another object is to provide a novel electrically actuated and controlled tape dispensing machine from which any of a plurality of predetermined incremental lengths of tape may be dispensed in any sequence following a simple manual maneuver by an operator and from which greater lengths of tape may be dispensed following periodic repetition of such a manual maneuver.

Another object is to provide a novel electrically actuated and controlled tape measuring and dispensing machine in which an automatic cycle is initiated by a manual maneuver indicating a desired length of tape.

Another object is to provide a novel electrically actuated and controlled tape dispensing machine having a tape feeding mechanism and a tape severing mechanism which are mutually exclusive in their operation.

Another object is to provide a novel electrically actuated and controlled tape dispensing machine in which the undispensed tape is continuously retained in engagement with the feed mechanism, thus eliminating slippage of the tape while the machine is at rest.

Another object is to provide a novel electric tape dispensing machine which has a tape moistening unit which is readily removable for cleaning.

Other objects are to provide an electric tape dispensing machine which has relatively few parts and, hence, is simple in construction and operation, which is simple to reload, which is of rugged long lasting construction, and which dispenses accurately measured, moistened tape segments at a high rate of speed.

The foregoing and other objects and advantages are apparent from the following description taken with the accompanying drawings, in which:

Fig. 1 is a plan view of an electrically actuated and controlled tape dispensing machine constructed in accordance with the teachings of the present invention, a portion of a tape moistening unit being broken away to expose details of construction;

Fig. 2 is a front elevational view thereof, a finger plate, an index number plate, and a finger stop being removed from an upper cover plate, and additional portions of the tape moistening unit being removed;

Fig. 3 is a left side elevational view thereof;

Fig. 4 is a right side elevational view thereof, a portion of the tape moistening unit being shown in broken lines;

Fig. 5 is a rear elevational view thereof, portions of the tape moistening unit being removed for greater clarity of detail;

Fig. 6 is a fragmentary front elevational view thereof, the removable tape moistening unit being removed;

Fig. 7 is a fragmentary right side elevational view thereof, a side cover plate being removed to show details of a drive mechanism;

Fig. 8 is an enlarged fragmentary rear elevational view taken generally along the line 8—8 of Fig. 7, showing details of the drive mechanism of Fig. 7;

Fig. 9 is a further enlarged sectional view of a movable yoke engaging a sliding clutch, the view being taken generally along the line 9—9 of Fig. 8;

Fig. 10 is a left side elevational view of the machine of Fig. 1, a portion of the tape moistening unit and a side frame member being removed for greater clarity of detail;

Fig. 11 is a sectional elevational view of the machine of Fig. 1 taken generally along the line 11—11 thereof;

Fig. 12 is a fragmentary view similar to Fig. 11, showing a cover plate with an attached measuring and control unit in raised position;

Fig. 13 is an enlarged sectional elevation showing details of a power unit and of a measuring and control unit, the view being taken generally along the line 13—13 of Fig. 10;

Fig. 14 is a further enlarged fragmentary, sectional elevation showing additional details of a measuring and control unit, the view being taken generally along the line 14—14 of Fig. 13;

Fig. 15 is a fragmentary upwardly directed plan view of a removed measuring and control unit, the view being taken normal to the axis of rotation of a dwell plate;

Fig. 16 is a side elevational view of the removed measuring and control unit of Fig. 15, a tension spring which biases the unit toward engagement with a strip of tape being shown in broken line;

Fig. 17 is a fragmentary sectional elevation of a clutch shifter assembly, the view being taken generally along the line 17—17 of Fig. 11;

Fig. 18 is a sectional elevation through the clutch shifter assembly, the view being taken generally along the line 18—18 of Fig. 17;

Fig. 19 is an enlarged top plan view of a removed dwell pin assembly;

Fig. 20 is a side elevational view of the removed dwell pin assembly;

Fig. 21 is an enlarged bottom plan view of a removed dwell plate;

Fig. 22 is a rear elevational view of a portion of a removable tape moistening unit;

Fig. 23 is an enlarged side elevational view of a removed cut-off cam;

Fig. 24 is a front elevational view of the removed cut-off cam of Fig. 23;

Fig. 25 is an isometric view of a removable floating shoe;

Fig. 26 is an enlarged side elevational view of a removed yoke with attachments thereto;

Fig. 27 is a front elevational view partly in section of the removed yoke of Fig. 26; and Fig. 28 is a schematic diagram of an electrical control circuit.

Referring to the drawings more particularly by reference numerals, 30 indicates generally an electrically actuated and controlled tape dispensing machine incorporating the concepts of the present invention. The machine 30 includes as supporting structure for the several operative units a left-hand side frame member 31 and a right-hand side frame member 32, which are illustrated as castings, each shaped as clearly shown in the several views of the drawings, and including rear portions 33 and 34, respectively, and forward outwardly offset portions 33' and 34', respectively (Figs. 1–5, 11 and 13). The frame members 31 and 32 are disposed in parallel spaced relation one to the other, this relation being rigidly maintained by circumferentially slotted spacing studs 35 and nuts 35' mounted in the rear portions 33 and 34 and base and end plates secured to the forward portions 33' and 34' and specifically mentioned below. A tape supporting plate 36 bent as clearly shown in Figs. 10 and 11 is disposed between the frame members 31 and 32 and is secured at its ends to the respective spacing studs 35 by means of screws 37. A roller 48 is rotatably mounted in and between the rear portions 33 and 34 above the plate 36 (Figs. 10 and 11). There is thus formed a receptacle 38 which receives a roll of gummed tape 39 on the plate 36 and roller 48. Guide plates 40 freely insertable in any of a plurality of annular slots 41 in the studs 35 as clearly shown in Figs. 1, 10 and 11 are provided to insure the roll of tape 39 being appropriately centered in the tape receptacle 38. It is obvious then that the receptacle 38, thus partitioned by the guide plates 40, is adapted to receive and maintain in dispensing position any of a plurality of different widths of tape. Each of the side frame members 31 and 32 has a laterally extending rearwardly disposed boss 42 to which a foot 43 of rubber or other resilient material is secured by means of a nut, bolt, and washer assembly 44.

The forward portions 33' and 34' of the members 31 and 32 embrace a motor chamber 50 and a control chamber 51, the latter being located over the former (Figs. 10–13). The motor chamber 50 is further defined by a base plate 52, a front plate 53, a tape slide plate 54, and the plate 36, the latter serving as a partition between the motor chamber 50 and the receptacle 38. The slide plate 54 forms a partition between the chambers 50 and 51, the chamber 51 being further defined by a shear plate 55 and a movable cover plate 56.

The forward portion 34' of the frame member 32 includes an overhanging outwardly extending portion 57 which, with the remaining part of the forward portion 34' and portions of the base plate 52 and the front plate 53, forms a gear and clutch casing which is closed by a removable cover plate 58. The base plate 52 and the front plate 53 are secured respectively to lower horizontal edges and forward vertical edges of the forward portions 33' and 34' of the side frame members 31 and 32 and cooperate with the studs 35 in maintaining the members 31 and 32 securely spaced by screws 59. Two additional feet 43 are secured to the underside of the base plate 52 by means of bolts 45 and together with those attached to the side frame members 31 and 32 provide means for supporting the machine 30 on a plane surface. The slide plate 54 is secured at its forward end to the front plate 53 by means of screws 60. At its rearwardly disposed end, the slide plate 54 adjoins the floor plate 36 and is secured along with the floor plate 36 to the spacing stud 35 by means of the screws 37.

As best shown in Figs. 10 through 13, the slide plate 54 has an inclined portion 65, having upwardly offset side extensions 66 and 67 forming a guide channel 68 adapted to receive a strip of tape 69 extending forwardly from the roll 39. A floating shoe 70, shaped as clearly shown in Fig. 25, is removably disposed in the channel 68 on top of the strip 69 and is maintained in appropriate longitudinal position by abutment of its forwardly disposed end with the shear plate 55. It will be noted that the shear plate 55 is spaced above the slide plate 54 so as to leave a horizontal gap through which the tape strip 69 may issue. A rectangular aperture 71 is formed in the inclined portion 65 of the slide plate 54 and a similar but wider aperture 72 is formed centrally of the floating shoe 70, these apertures 71 and 72 being for purposes to appear.

Operative units of the machine 30 include a power unit 75 (7–13, 17, 18, 26 and 27), a measuring and control unit 76 (1, 10–16, 19–21 and 23–25), a cut-off unit 77 (6, 7, 10 and 11), and a tape moistening unit 78 (1–4, 11 and 22).

The power unit 75 includes a motor 80 disposed in the power chamber 50 and secured to the base plate 52 by means of screws 81 (Figs. 7–13, 17, 18, 26 and 27). A starting and running capacitor 84 is mounted upon the motor frame by means of a strap 73 and screws 74. Other types of motors may be employed, but for dependability a capacitor starting and running motor is preferred. A motor shaft 82 extends into the gear and clutch casing through a bay 83 formed in the side frame member forward portions 34' as clearly shown in Fig. 13. A motor pinion 85 secured to the extended shaft 82, as by a setscrew 86, engages a large idler gear 87 mounted so as to be clearly rotatable on a shaft bolt 88 appropriately secured to a laterally extending mounting element 89 of the side frame member forward portion 34'. The idler gear 87 engages a sliding clutch gear 90. It will be noted that the idler gear 87 has a comparatively wide face, preferably substantially twice the width of the clutch gear 90, and is therefore adapted to engage the clutch gear 90 in a plurality of different operative alignments, as appears below.

The clutch gear 90, shaped as clearly shown in Figs. 8, 9 and 13, is both rotatably and slidably mounted on a feed shaft 95. The clutch gear 90 has laterally extending integral hub elements 96 and 97, the latter including a peripheral annular slot 98. The hub element 96 has a toothed face 99 engageable with a toothed face 100 of a feed clutch 101 threadedly mounted on one end of the feed shaft 95. The hub element 97 has a toothed face 102 which is similarly, but not simultaneously, engageable with a toothed face 103 of a cut-off cam 104. As best shown in Fig. 13, the feed shaft 95 is journaled in forward portions 33' and 34' of the side frame members 31 and 32. Spring clips 105 engage the feed shaft 95 adjacent the portions 33' and 34' to provide against excessive lateral shifting thereof.

A feed wheel 106 having a knurled peripheral face 107 is secured to the feed shaft 95 by a setscrew 108, the feed wheel 106 being disposed so as to project through the rectangular aperture 71 in the inclined portion 65 of the slide plate 54. This projection of the knurled face 107 through the aperture 71 obviously permits contact with the tape strip 69 disposed in the channel 68. It will be noted, then, that when the clutch gear 90 engages the feed clutch 101, there is a driving relationship established from the motor 80 to the feed wheel 106. A rotatable measuring wheel 110 having a knurled face 111 and forming a part of the measuring and control unit 76 is adapted, as will appear, to maintain the tape strip 69 in appropriate pressure contact with the knurled face 107 of the feed wheel 106. It is obvious, therefore, that the feed wheel 106 driven from the motor 80, as above described is adapted to feed the tape strip 69 from the roll 39 and cause it to issue from the front of the machine 30.

The control and measuring unit 76 includes a main bracket member 115 shaped as clearly shown in the drawings (Figs. 1, 10–16, 19–21 and 23–25). The member 115 is preferably of cast or forged aluminum, or similar light metal, and is secured to a cross-shaft 116 rotatably journaled in the forward portions 33' and 34' of the side frame members 31 and 32. A compression spring 117 mounted adjacent one end of the shaft 116 acts between the bracket member 115 and the forward portion 33' to maintain the whole control and measuring unit 76 in appropriate alignment with the feed wheel 106 (Fig. 13). The cover plate 56, a circular numbered index dial 118, and a finger stop 119 surmount the member 115 in the order named and are secured thereto by screws 120 as best shown in Figs. 14 and 16. The bracket member 115 has a vertical bore 125 into opposite ends of which are pressed sleeve bearings 126 and 127, each so as to extend beyond the respective end of the bore 125. A hollow dial shaft 128 is rotatably assembled in the bearings 126 and 127 so as to dispose a dwell plate 129, appropriately secured to the lower end of the hollow shaft 128, adjacent the lower bearing 126. A gear shaft 132, having a worm wheel 133 appropriately secured to a lower end thereof, is rotatably mounted in the shaft 128 and is secured therein by a screw 135, the head of which rests on an internal annular shoulder formed in the shaft 128, as clearly shown in Fig. 14. A dialing disc or finger plate 140 having a plurality of spaced finger holes 141 is secured to the upper end of the shaft 128 by means of a screw 142 threadedly mounted in the upper end of the shaft 128 and having a longitudinal passage 143 therethrough for the purpose of admitting oil to the interior of the shaft 128. It is obvious from Fig. 14 and from the above description that the dwell plate 129 and the worm wheel 133 are each rotatable independently of the other. It is further evident that the dialing disc 140, connected as above described to the dwell plate 129, provides means for effecting a predetermined angular displacement of the latter.

A dwell pin assembly 145 comprising a shaft 146, a yoke 147, and two dwell pins 148 and 149, rigidly assembled as clearly shown in Figs. 19 and 20, is disposed as best shown in Fig. 14 so as to be cooperatively associated with both the dwell plate 129 and the worm wheel 133. The dwell pins 148 and 149 are spaced unequal distances from the shaft 146 and extend slidably through holes in the worm wheel 133 so as to be engageable with correspondingly spaced dwells 156 and 157 in the dwell plate 129. The shaft 146 is slidably received in a recess 152 of the shaft 132 and is retained therein by a leaf spring 153 secured to the bracket member 115 by means of screws 154. The spring 153 also biases the dwell pin assembly 145 towards the dwell plate 129, thus effecting entrance of the dwell pins 148 and 149 into corresponding dwells 156 and 157 when the relative angular positions of the dwell plate 129 and the worm wheel 133 are appropriate to such engagement. It will be noted that, owing to the eccentric spacing of the dwell pins 148 and 149 and the corresponding dwells 156 and 157 from their respective centers of rotation, the engagement of the dwell pins with the dwells is possible in but a single position of the worm wheel 133 relative to the dwell plate 129.

The free end of the spring 153 is bent to a horseshoe shape and is adapted to engage a spring biased actuator 155 of a standard normally closed micro-switch 159 mounted on the bracket member 115 by means of screws 151. A nut and bolt assembly 158 mounted in the bend of the leaf spring 153 provides means for adjusting the horseshoe end thereof relative to the actuator 155. It is apparent from Fig. 14 and from the above description that angular displacement of the dwell plate 129 by means of the dialing disc 140 will force the dwell pins 148 and 149 from the dwells 156 and 157 and the shaft 146 downwardly and thus cause the horseshoe end of the spring 153 to move downwardly away from the actuator 155 of the microswitch 159. This movement of the spring 153 enables the switch 159 to attain its normally closed condition, since the actuator 155 will be free to move outwardly under the usual spring bias, in which condition it will remain until the dwell pins 148 and 149 re-enter the dwells 156 and 157, thus permitting the spring 153 to move again into contact with the actuator 155 to open the switch 159.

As best shown in Figs. 13–15, the worm wheel 133 is in driven engagement with a worm 160 secured by a setscrew to one end of a shaft 161 journaled in bearing sleeves mounted in clevis arms 162 and 163 forming a part of the bracket 115. The above mentioned measuring wheel 110 is secured to the shaft 161 by means of a setscrew 164 and is disposed between the clevis arms 162 and 163. The circumference of the measuring wheel 110 and the gear ratio establish the basic tape increment normally dispensed. As illustrated, three inches of tape is dispensed per angular segment of rotation of said dialing disc 140 equal to the center line to center line distance between finger holes 141, there being fourteen equally spaced finger holes 141, one of which is always under the finger stop 119. To achieve this with standard gears having a ratio of 10:1, the circumference of the measuring wheel is 4.2 inches. Manifestly, the circumference of the measuring wheel 110 may be equal to the desired increment, in which case the gears would require revision accordingly. The wheel 110, the index dial 118, and the gears may be replaced as desired to establish other basic tape increments.

As best shown in Figs. 14 and 21, the dwell plate 129 has a peripheral knurled edge 168, and, as best shown in Figs. 13, 15 and 16, this knurled edge 168 is continuously engaged by a spring detent 169 secured to the bracket member 115 by means of a screw 170 and a screw and nut assembly 171.

A tension spring 173 having one end hooked about the screw and nut assembly 171 and the other into a hole 174 in the forward portion 34' of the right-hand side frame member 32 biases the measuring and control unit 76 to a position wherein the knurled face 111 of the feed wheel 110 projects through the rectangular aperture 72 of the floating shoe 70 and rests with substantial pressure upon the tape strip 69 which is supported at this point of pressure by the knurled face 107 of the feed wheel 106 (Figs. 10 and 13). The measuring wheel 110 thus maintains the tape strip 69 in frictional contact with the feed wheel 106 and will itself be rotated through frictional contact of its face 111 with the strip 69 as the latter is fed through the machine 30. The resultant rolling contact of the measuring wheel 110 with a moving tape strip 69 causes the worm wheel 133 to rotate, and it is obvious that a specific length of the tape strip 69 passed through the machine 30 will be reflected as a specific angular displacement of the worm wheel 133. Conversely, a predetermined angular displacement of the worm wheel 133 may be effected only by a corresponding number of rotations of the measuring wheel 110.

As best shown in Fig. 1, the index dial 118 has an arithmetical progression of numbers arranged in a circle thereon, the spacing between numbers being such as to correspond to the angular spacing of the finger holes 141 in the dialing disc 140. The angular displacement of each of these numbers from a position adjacent the finger stop 119 is equal to the angular displacement which must be achieved in the position of the worm wheel 133 to effect peripheral traverse of the face 111 of the measuring wheel 110 corresponding to the respective numbers. Then, since, in the normal operation of the machine 30, the total peripheral traverse of the face 111 is equal to the length of the tape strip 69 passed through the machine 30, it is apparent that the index dial 118, the finger stop 119, and the dialing disc 140 cooperate to provide means for manually indicating a desired length of tape strip to be dispensed from the machine 30.

Assuming the dwell pins 148 and 149 occupy the dwells 156 and 157, it is clear that manual rotation of the dialing disc 140 will cause the pins 148 and 149 to be displaced from the dwells 156 and 157 as the dwell plate 129 rotates with the dialing disc 140. Such rotation of the dialing disc 140 and the dwell plate 129 overcomes the detent action of the spring detent 169, the latter, however, being sufficiently strong to prevent any tendency of these parts to rotate other than that which is thus manually enforced. When the dwell pins 148 and 149 are thus ejected from the dwells 156 and 157, the micro-switch 159 is permitted to close as previously described. This closed condition of the switch 159 effects rotation of the feed wheel 106, as will appear, thus causing the tape strip 69 to be fed through the machine 30 and the worm wheel 133 to be rotated until subsequent re-entrance of the dwell pins 148 and 149 into the dwells 156 and 157, whereupon the consequent reopening of the micro-switch 159 is effective to disconnect the driving impetus being delivered to the feed wheel 106 and the measuring and control unit 76 is brought to rest.

The micro-switch 159 is effective to actuate a shifter assembly 180 which, in turn, is adapted to influence the operation of the power unit 75, as will appear. As best shown in Figs. 10 through 12, 17, 18, 26 and 27, the shifter assembly 180 comprises a solenoid 181 secured by screws 182 to the forward portion 34' of the right-hand side frame member 32. A movable armature 183 includes parallel extensions 184 interconnected by a rivet pin 185 to form an open space 186 which receive a strip plate 187 secured to said armature 183 for movement therewith. The strip 187 extends normal to the longitudinal axis of the armature 183 and is adjustably secured by means of nuts 188 to a shifter bar 189 extending parallel to the longitudinal axis of the armature 183, the shifter bar 189 being slidably mounted in the forward portions 33' and 34' of the side frames 31 and 32. A compression spring 193 mounted upon the shifter bar 189 acts between the forward portion 34' and the strip 187 to bias all moving parts of the shifter assembly 180 in a direction away from the position enforced by energization of the solenoid 181. The shifter bar 189 extends through and beyond the forward portion 34' into the geared casing and has mounted thereupon, by means of nuts 190, a clutch yoke 191. The yoke 191 is a plate-like member shaped as clearly shown in Fig. 26 and has fingers 192 which engage the groove 98 in the hub 97 of the clutch gear 90 as clearly shown in Fig. 9. A cam lug 195 is riveted to the yoke 191, as clearly shown in Figs. 26 and 27, so as to extend therefrom toward the forward portion 34' of the side frame member 32. An annularly grooved disc or spool 196 of non-conducting material is adjustably mounted upon the yoke 191 by means of a screw 197 and a jamb nut 198. The grooved disc 196 engages a switch pole 199, as clearly shown in Fig. 17, the switch pole being thus adapted for movement between switch contacts 200 and 201 upon movement of the shifter bar 189. The switch pole 199 and the contacts 200 and 201 for a part of a single pole double throw switch 202 mounted upon the forward portion 34' by means of screws 203, as best shown in Figs. 7 and 8.

When the solenoid 181 is actuated, the armature 183 is pulled in and it is obvious that the clutch gear 90 will then be shifted laterally along the feed shaft 95 until the toothed face 99 on the hub 96 engages the toothed face 100 on the feed clutch 101. Upon de-energization of the solenoid 181, the spring 193 is obviously effective to shift the clutch gear 90 away from engagement with the feed clutch 101 toward a position wherein the toothed face 102 on the hub 97 of the clutch gear 96 will engage the toothed face 103 on the cut-off cam 104. These opposite engagements constitute the limit of the lateral movement of the clutch gear 96 upon the feed shaft 95, and it is to be noted in reference to Fig. 17 that the switch pole 199 makes contact with the switch contact 200 when the clutch gear 90 is in engagement with the feed clutch 101, and that the switch pole 199 makes contact with the switch contact 201 when the clutch gear 90 is in engagement with the cut-off cam 104.

The cut-off unit 77 is driven by the clutch gear 90 during engagement of the latter with the cut-off cam 104. The cut-off cam 104 includes, as best shown in Figs. 23 and 24, two parallel circular flange elements 205 and 206 connected by an eccentrically disposed circular cam element 207. A hub portion 208 extends coaxially from the circular flange element 205 and includes the toothed face 103. A generally arcuate cam lug 210 is formed upon an external face 209 of the flange element 205, being disposed in predetermined angular relation to the cam element 207 as best shown in Fig. 23. This cam lug 210 includes an inclined portion 211 extending from the face 209 of the flange element 205 to a ledge portion 212 which is parallel to the face 209. The other end of the ledge portion 212 intersects a shoulder portion 213 which extends normally from the ledge portion 212.

The cut-off cam 104 is mounted on the feed shaft 95 so as to be freely rotatable thereon. As best shown in Fig. 13, the cut-off cam 104 occupies a position adjacent the forward portion 34' of the right-hand side frame member 32 in which position the groove between the flange elements 205 and 206 is continuously engaged by a cut-off link 215. This cut-off link 215, of bell crank shape, as clearly shown in Fig. 7, is biased by means of a tension spring 216 into continuous engagement with the cam element 207 of the cut-off cam 104. It is obvious that engagement of the cut-off link 215 between the flange elements 205 and 206 prevents substantial lateral movement of the cut-off cam 104 away from the forward frame portion 34', and it is further obvious that engagement of the cut-off link 215 with the eccentric element 207 will provide an oscillatory response of the link 215 to rotation of the cut-off cam 104. It is clear, then, that a single rotation of the cut-off cam 104 will cause a single oscillation of the cut-off link 215 whereby a forward extension 217 of the latter is caused to make a single substantially vertical reciprocation. As best shown in Figs. 6 and 7, the forward extension 217 of the cut-off link 215 continuously engages an aperture 218 in a cut-off knife 219 pivotally connected to the shear plate 55 by means of a bolt and nut assembly 220. The cut-off knife 219 is adapted to oscillate in correspondence with the cut-off link 215 and is thus enabled to cooperate with the shear plate 55 to produce a shearing action, which is adapted to sever a tape strip such as 69 interposed therebetween.

Since but a single oscillation of the cut-off knife 219 is necessary to sever a dispensed strip of tape 69, it is desirable that the clutch gear 90 be disengaged from the cut-off cam 104 upon the completion of a single appropriate rotational movement of the latter. This disengagement is effected through cooperation of the cam lug 195 mounted on the yoke 191 and the arcuate cam element 210 formed on the face 209 of the flange element 205 of the cut-off cam 104. It will be noted that, with the clutch gear 90 in the aforementioned limit position wherein it engages the cut-off cam 104, an end 225 of the cam lug 195 is disposed substantially adjacent the face 209 of the flange element 205. Thus, as the cut-off cam 104 is rotated, the cam element 210 is carried around until the inclined portion 211 engages the end 225 of the cam lug 195. As rotation of the cut-off cam 104 continues, the yoke 191, and, consequently, the clutch gear 90 are shifted laterally along the feed shaft 95 until the end 225 of the cam lug 195 rests against the ledge portion 212 of the cam element 210, the clutch gear 90 being thus shifted to a position wherein its toothed face 102 is out of engagement with the toothed face 103 of the cut-off cam 104. Continued rotation of the cut-off cam 104 due to inertia is prevented by abutment of the shoulder portion 213 with the cut-off lug 195. With the end 225 of the cam lug 195 resting against the ledge portion 212 of the cam element 210, the clutch gear 90 is in a neutral position wherein it engages neither the feed clutch 101 nor the cut-off cam 104 in driving relation. It will be noted further that when the clutch gear 90 is in this neutral position, the yoke 191 is in a corresponding position wherein the switch pole 199 contacts neither the switch contact 200 nor the switch contact 201.

It is obvious that, with the cut-off cam 104 in an angular position wherein the cam lug 195 is engageable with the cam element 210, engagement of the clutch gear 90 with the cut-off cam 104 is impossible. However, it is not necessary that this condition be overcome before subsequent engagement of the clutch gear 90 with the feed clutch 101 for the purpose of feeding an additional portion of the tape strip 69 from the machine 30, for when the clutch gear 90 is subsequently shifted so as to engage the feed clutch 101, the cam lug 195 is disengaged from the cam element 210, whereupon the cut-off cam 104 is freed to rotate. Thus freed, the cut-off cam 104 is enabled to respond to a movement imparted thereto owing to the aforementioned predetermined angular relation between the cam element 207 and the cam element 210, this relation being such that enagement of the spring-biased cut-off link 215 with the cam element 207 is adapted to apply a force having a tangential component to the cut-off cam 104 when the latter is in a position wherein the cam lug 195 abuts the shoulder portion 212 of the cam element 210. It is obvious that upon release of the latter from the cam lug 195, the cut-off cam 104 will be rotated through a partial revolution, thus passing the position wherein the cam element 210 is engageable by the cam lug 195.

It is extremely desirable that the tape dispensed from the machine 30 be moistened on the gummed side thereof. To this end, the depicted embodiment of the machine 30 includes the tape moistening unit 78.

The tape moistening unit 78 includes a water dispensing assembly 230 and a water supply reservoir 231, each of which is readily removable from the remainder of the machine 30. The water dispensing assembly 230 is shown removed in Fig. 22 of the drawing, and is seen to comprise a water tank 232 connected by means of a flexible hose 233 and appropriate fittings 234 and 235 to a water level regulator 236. The view of the water tank 232 in Fig. 22 is from the rear thereof. Front, left-hand side, right-hand side and sectional elevations of the tank 232 are best shown in Figs. 2, 3, 4 and 11, respectively. The tank 232 is adapted to receive water via the aforementioned hose connection with the water level regulator 236, an appropriate water level such as 237 in Fig. 11 being maintained in the tank 232 in a manner to be described. A bristle brush 238 is disposed within the tank 232 so that the free ends of the bristles extend slightly above an upper rim 239 thereof. A guide and presser unit 240 serves as a cover for the tank 232 and is pivotally mounted by means of a rod 241 between upstanding lugs 242 of the tank 232. The guide and presser unit 240 comprises a plate member 243 bent as clearly shown in Fig. 11, to which is attached a guide strip 244 spaced therefrom so as to provide a guide channel for the tape strip 69. The plate member 243 supports a weight 250 which is adjustably disposed along a pin 251, thus adapting the unit 240 to bear with adjustable pressure upon the tape strip 69 and to press it against the end of the bristle brush 238. It is obvious that, as the tape strip 69 passes over the brush 238, water rising by capillary action will be distributed over the underneath side of the tape, and there is thus required a continuous supply of water to the tank 232.

The tank 232 is supported by means of a metal sleeve 255 appropriately secured so as to extend forwardly from the front plate 53 as best shown in Fig. 11. Alignment is maintained by a locating pin 256 mounted on the front plate 53 and adapted to be received in a recessed boss 257 of the tank 232. The tank 232 is secured against inadvertent removal from the sleeve 255 by a set-screw 258 adapted to cooperate with a groove 259 in the sleeve 255. An electrical heating element 260 is received in the sleeve 255, being thus adapted to heat the contents of the tank 232. A thermostat 261 controls the temperature of the contents of the tank 232, the setting of the thermostat 261 being adjustable by means of a screw 262 projecting forwardly from the front plate 53 as best shown in Fig. 10. The fact that the adjusting screw 262 is obscured by the tank 232 is considered an advantage in that the likelihood of tampering with the adjustment is considerably lessened by such a location. The thermostat 261 is supported by means of a bracket plate 263 bent as best shown in Figs. 10 and 11 and secured between the slide plate 54 and the front cover plate 53 by means of the screws 60.

The water level regulator 236 is mounted on the outside of the right-hand side frame member 32, as best shown in Fig. 4, by means of a screw 270, and, being substantially cup-shaped, is adapted to receive water from the water supply reservoir 231. The water supply reservoir 231, comprising a glass bottle 272 having a tubular spout 273 cemented into a rubber plug 274, is supported in the position shown in Fig. 4 by means of a rack 275 attached to the frame member 32 by means of a screw 276 and by the tubular spout 273 which rests upon appropriately formed fins within the water level regulator 236. It is obvious from Fig. 4 that the level at which the water level regulator 236 is mounted will determine the level 237 within the water tank 232, and, further, owing to the ample supply of water in the water reservoir 231 which is continuously available to supply water to the water level regulator 236, that, regardless of the rate of absorption of water from the water tank 232, the level 237 may be maintained over long periods of time. It is clear that additional threaded holes may be provided in the frame member 32 so that the water level regulator 236 may be positioned at any of a plurality of preselected levels, thus to enable the selection of an appropriate water level in the water tank 232.

The various operations of the machine 30 are controlled by means of simple electrical circuits arranged as schematically shown in Fig. 28. Thus, the machine 30 has an electrical extension cord 280 (Figs. 1 and 2) adapted to be plugged into a conventional electric socket (not shown). The cord 280 is connected to a double pole single throw toggle switch 281 mounted on the front cover plate 53 of the machine 30 as best shown in Fig. 7. The machine 30 is prepared for operation by switching the toggle switch 281 to the "on" position, and it is clear from Fig. 28 that the closing of the switch 281 will energize a pilot light 282 mounted immediately below the switch 281, and also the circuit of the heater 260. Normally, the closing of the switch 281 will not affect operating parts of the machine 30 other than the pilot light and the heater just mentioned. It is clear from Fig. 28, however, that the closing of the switch 281 prepares a second circuit comprising the coil 285 of the solenoid 181 and the switch 159 which awaits only the closing of the latter in order for the solenoid 181 to be energized. Similarly, a third circuit is prepared through the several windings 286 of the motor 80 through the motor capacitor 84 and through the single pole, double throw switch 202, the latter including the switch pole 199 and the switch contacts 200 and 201. Due to the neutral position of the switch pole 199, however, this third circuit, like the second circuit, is normally inactive upon closure of the switch 281.

*Operation*

When the machine 30 is in a normal condition of rest, the dwell pins 148 and 149 engage the dwells 156 and 157 in the dwell plate 129. This permits the spring 153 to maintain the normally closed switch 159 in open condition, thereby precluding energization of the solenoid 181, even though the switch 281 may be closed. Also, when the machine 30 is in a normal condition of rest, the clutch gear 90 is in the aforementioned neutral position wherein it is out of clutching engagement with both the feed clutch 101 and the cut-off cam 104, in which position, as has been mentioned, the switch pole 199 is out of contact with both the switch contacts 200 and 201, thus precluding energization of the motor 80. Now, assuming the machine 30 to be supplied with a roll of tape 39 with an extended strip 69 threaded as shown in the several views of the drawings, the machine is ready for operation.

If it be assumed, for example, that a twelve inch segment of tape is desired, a finger, pencil, or the like, is inserted in the finger hole 141 of the dialing disc 140, which is opposite the number 12 of the index dial 118, and the dialing disc 140 is rotated clockwise until the finger, or the like, strikes the finger stop 119. This rotation of the dialing disc 140 effects an equal angular displacement of the dwell plate 129, and it is clear that neither the dialing disc 140 nor the dwell plate 129 are disposed to return to their original positions, but are maintained in their stopped position by means of the detent spring 169. Obviously, upon rotation of the dwell plate 129, the dwell pins 148 and 149 are displaced from the dwells 156 and 157, which displacement moves the spring 153 downwardly so as to permit the switch 159 to attain its normally closed condition.

The closure of the switch 159, as is clear from Fig. 28, causes the coil 285 of the solenoid 181 to be energized, whereupon the armature 183 is pulled in and the clutch gear 90 is caused to engage the feed clutch 101. This movement of the armature 183 also causes the switch pole 199 to be moved against the switch contact 200, thus closing the motor circuit as clearly indicated in Fig. 28. Thus energized, the motor 80 will drive the feed wheel 106, the drive being effected through the motor pinion 85, the idler gear 87, the clutch gear 90, the feed clutch 101, and the feed shaft 95. Thus, as above described, the tape strip 69 is fed forwardly by means of the frictional engagement of the face 107 of the feed wheel 106 upon the tape strip 69, this frictional contact being maintained by constant pressure of the measuring wheel 110 upon the top of the tape. As the tape strip 69 moves forward, the measuring wheel 110 is caused to rotate due to frictional contact of its face 111 on top of the tape strip 69, whereupon the worm 160 causes the worm wheel 133 to rotate carrying with it the dwell pins 148 and 149. The tape is continuously fed until the dwell pins 148 and 149 are once more brought into alignment with the dwells 156 and 157 in the dwell plate 129 whereupon the re-entrance of the dwell pins 148 and 149 into the dwells 156 and 157, the spring 153 causes the switch 159 once more to be opened. When the switch 159 is thus re-opened, the solenoid 181 is deenergized and the spring 190 causes the armature 183 to drop out. The clutch gear 90 will thus be shifted out of engagement with the feed clutch 101 past its neutral position and into engagement with the cut-off cam 104. It will be noted that this movement of the clutch gear 90 into engagement with the cut-off cam 104 is possible at this phase of the operation due to the cut-off cam 104 having been freed to rotate under the influence of the spring biased cut-off link 215 as described above.

It is obvious then, that the tape strip 69 is fed continuously through the machine 30 until the worm wheel 133 is caused to be displaced through an angle equal to that which was manually effected in respect to the dialing disc 140. If, for further example, the finger hole 141, which was opposite the number 30 on the index dial, had been rotated to a position adjacent the finger stop 119, the worm wheel 133 would have had to move through a proportionately greater angle. In either case, however, the angular movement of the worm wheel 133 required to effect re-alignment of the dwell pins 148 and 149 with the dwells 156 and 157 is produced as a result of rotation of the measuring wheel 110 in contact with the moving tape strip 69. It is, therefore, manifest that the length of the tape strip 69 which is fed through the machine 30 between the closing of the switch 159 and its subsequent re-opening, is proportionate to the initial angular displacement of the dialing disc 140.

As the clutch gear 90 is moved out of engagement with the feed clutch 101, the feeding action is abruptly halted. Also, it is apparent that the motor 80 will be deenergized due to breaking the contact between the switch pole 199 and the switch contact 200. This de-energization of the motor 80, however, is only momentary due to the switch pole 199 being immediately carried into contact with the switch contact 201 as the clutch gear 90 engages the cut-off cam 104. The motor is thus caused to continue to rotate during engagement of the clutch gear 90 with the cut-off cam 104, which engagement is maintained as above-described through substantially one complete revolution to effect action of the cut-off knife 219 as above-described. Thus, the tape segment which has been caused to issue from the front of the machine 30 is severed from the tape strip 69 remaining therein and the clutch gear 90 is returned to its neutral position by cooperation of the cam element 210 with the cam lug 195, as aforementioned. This return of the clutch gear 90 to its neutral position disposes the switch pole 199 once more between the contacts 200 and 201 out of contact with both, and thus causes the motor 80 to be deenergized, and the machine 30 to be returned to its original position of rest.

It is clear, then, that a simple manual maneuver in which the dialing disc 140 is rotated through an angle proportional to the length of tape segment desired from the machine 30 is effective to instigate a cycle of operation which dispenses the desired segment. It is also manifest from the above description of operation that tape segments greater in length than the highest number on the index dial 118 may be procured merely by dialing a first portion of the desired increment and then dialing a second portion before an ensuing cut-off action is effected.

It is clear that there has been described an electrically actuated and controlled tape dispenser which fulfills the objects and advantages sought therefor.

It is to be understood that the foregoing description and the accompanying drawings have been given by way of illustration and example. It is also to be understood that changes in the form of the elements, rearrangement of parts, and substitution of equivalent elements, which will be obvious to those skilled in the art, are contemplated as within the scope of the present invention which is limited only by the claims which follow.

What is claimed is:

1. In a tape measuring and dispensing machine, in combination, a support, a feed wheel rotatably mounted on said support, tape segment selector and measuring means mounted on said support, a tape severing knife mounted on said support, power means for actuating said feed wheel and said knife, and means for operatively interconnecting said power means alternately with said feed wheel and said knife including clutch mechanism having a reciprocatable rotary member, first shifting means for moving said member into position to effect rotation of said feed wheel, second shifting means for moving said member into position to effect cutting action of said knife, and third shifting means for moving said member into a position of disengagement from both said feed wheel and said knife.

2. In a power driven tape measuring and dispensing machine, in combination, a support, a tape feed wheel rotatably mounted on said support, a tape severing knife movably mounted on said support, and power mechanism for alternately rotating said feed wheel and moving said knife through a tape severing stroke comprising a motor, a two-position clutch including a shiftable and rotatable driving member and two rotatable driven members engageable by said driving member, one of said driven members being operatively connected with said feed wheel for rotation thereof, the other of said driven members being operatively connected to said knife for cutting actuation thereof, gearing connecting said motor and said driving member for rotation of the latter by the former, power means for shifting said driving member into driving engagement with said one driven member, means for shifting said driving member from engagement with said one driven member into engagement with said other driven member, said last-mentioned means being effective upon deenergization of said power means and said motor, means for reenergizing said motor upon engagement of said driving member with said driven member, and means for shifting said driving member to neutral rest position and deenergizing said motor upon rotation of said other driven member a predetermined amount less than one full revolution.

3. The combination of claim 2 wherein the means for shifting said driving member to neutral rest position includes stop means for preventing rotation of said other driven member beyond a predetermined portion of one full revolution, and means for effecting completion of one full revolution upon release of said stop means.

4. The combination of claim 3 in which said stop means includes a projection secured to and extending outwardly at right angles from one face of said other driven clutch member and a lug secured to a shiftable clutch yoke forming part of said shifting means, said lug being in the path of said projection when said driving member is in engagement with said other driven member.

5. The combination of claim 2 in which said feed wheel, said driving clutch member, and said two driven clutch members are mounted upon a common shaft, rotatably mounted upon said support, said feed wheel and said one driven clutch member being secured to said shaft for rotation therewith, said driving member and said other driven clutch member being freely rotatable thereon.

6. The combination of claim 2 in which said gearing connecting said motor and said driving clutch member includes an intermediate idler gear of substantial width, said driving clutch member being of annular form and having peripheral teeth which continuously engage the teeth of said intermediate idler gear in all positions of said driving clutch member, so that said motor is always operatively connected to said driving clutch member for positive rotation of the latter.

7. The combination of claim 2 in which said power means for shifting said driving member into engagement with said one driven member includes a solenoid having a movable armature, a shaft connected to said armature for movement therewith, a clutch yoke secured to said shaft and engaging said driving member, and in which said means for shifting said driving member from engagement with said one driven member into engagement with said other driven member includes a heavy spring surrounding said shaft carrying said clutch yoke and biasing such shaft and clutch yoke against the action of said solenoid.

8. The combination of claim 1 wherein the power means for actuating said feed wheel and said knife includes an electric motor, and switch means for energizing and deenergizing said motor, said switch means having an element connected for shifting movement with said reciprocatable rotary member whereby the shifting of the latter into position either to effect rotation of the feed wheel or to effect cutting action of the knife energizes the motor and the shifting of the reciprocatable rotary member into a position of disengagement from both the feed wheel and the knife deenergizes the motor.

9. The combination of claim 8 wherein the switch means comprises a single pole, double throw switch.

10. The combination of claim 9 wherein the first shifting means includes controllable magnetic means, the second shifting means includes spring means, and the third shifting means includes inclined plane means, the force of said spring means being inferior both to the force of said magnetic means and to the force of said inclined plane means.

11. The combination of claim 10 wherein the tape segment selector and measuring means includes manually operable means for selecting lengths of tape to be dispensed, said manually operable means including single pole, single throw switch means for controlling said magnetic means.

12. The combination of claim 11 wherein the tape segment selector and measuring means further includes a rotatably mounted measuring wheel adapted for driven engagement with said feed wheel, and means interconnecting said feed wheel with said single pole, single throw switch means for deenergizing said magnetic means upon rotation of the measuring wheel an amount in accordance with the selected length of tape segment to be dispensed.

13. A tape dispensing machine comprising, in combination, a support, a feed wheel rotatably mounted on said support for dispensing tape, a knife pivotally mounted on said support for severing dispensed tape, an electric motor mounted on said support, means for operatively connecting said motor alternately with said feed wheel and said knife, said means including a shiftable clutch member in driven connection with said motor, spring means biasing said clutch member towards driving connection with said knife, a solenoid connected with said shiftable clutch member for shifting the same against the biasing action of said spring means into driving connection with said feed wheel, and a selecting and measuring assembly mounted on said support, said selecting and measuring assembly including switch means for controlling the energization and deenergization of said solenoid.

14. The combination of claim 13 wherein said selecting and measuring assembly further includes manually operable means for simultaneously selecting a length of tape to be dispensed and actuating said switch to energize said solenoid.

15. The combination of claim 14 wherein said selecting and measuring assembly further includes means responsive to rotation of said feed wheel for actuating said switch to deenergize said solenoid.

16. The combination of claim 15 wherein a double throw switch is provided for controlling said electric motor, and means connecting said double throw switch with said shiftable clutch member for movement therewith whereby said motor is energized upon establishment of a driving connection with either said feed wheel or said knife.

17. The combination of claim 16 wherein the means for connecting said motor with said knife includes means operable upon the actuation of said knife to move the shiftable clutch member out of driving connection with the knife and simultaneously to deenergize said motor.

(References on following page)

References Cited in the file of this patent

UNITED STATES PATENTS

| | | |
|---|---|---|
| 1,904,861 | Ettl | Apr. 18, 1933 |
| 1,960,945 | Krueger | May 29, 1934 |
| 1,996,313 | Watkins | Apr. 2, 1935 |
| 2,097,031 | Loewenberg | Oct. 26, 1937 |
| 2,248,482 | Shearer | July 8, 1941 |
| 2,264,647 | Stearns | Dec. 2, 1941 |
| 2,275,409 | Anderson | Mar. 10, 1942 |
| 2,298,492 | Longfield | Oct. 13, 1942 |
| 2,324,796 | Neptune | July 20, 1943 |
| 2,339,194 | Reichelt | Jan. 11, 1944 |
| 2,382,787 | Gautier et al. | Aug. 14, 1945 |
| 2,408,363 | Beckman et al. | Oct. 1, 1946 |
| 2,434,996 | Gautier et al. | Jan. 27, 1948 |
| 2,506,673 | Krueger | May 9, 1950 |
| 2,601,159 | Marsh | June 17, 1952 |